US008823951B2

(12) United States Patent
Mimeault et al.

(10) Patent No.: US 8,823,951 B2
(45) Date of Patent: Sep. 2, 2014

(54) 3D OPTICAL DETECTION SYSTEM AND METHOD FOR A MOBILE STORAGE SYSTEM

(75) Inventors: Yvan Mimeault, Québec (CA); Louis Perreault, Québec (CA)

(73) Assignee: Leddartech Inc., Québec (Quebec) (CA)

( * ) Notice: Subject to any disclaimer, the term of this patent is extended or adjusted under 35 U.S.C. 154(b) by 89 days.

(21) Appl. No.: 13/703,632

(22) PCT Filed: Jul. 15, 2011

(86) PCT No.: PCT/IB2011/053172
§ 371 (c)(1),
(2), (4) Date: Dec. 12, 2012

(87) PCT Pub. No.: WO2012/011037
PCT Pub. Date: Jan. 26, 2012

(65) Prior Publication Data
US 2013/0083316 A1     Apr. 4, 2013

Related U.S. Application Data

(60) Provisional application No. 61/366,989, filed on Jul. 23, 2010.

(51) Int. Cl.
| | |
|---|---|
| *G01B 11/14* | (2006.01) |
| *G01S 17/08* | (2006.01) |
| *G01V 8/20* | (2006.01) |
| *G01S 17/02* | (2006.01) |
| *A47B 53/02* | (2006.01) |
| *G01J 1/16* | (2006.01) |

(52) U.S. Cl.
CPC . *G01J 1/16* (2013.01); *G01B 11/14* (2013.01); *G01S 17/08* (2013.01); *G01V 8/20* (2013.01); *G01S 17/026* (2013.01); *A47B 53/02* (2013.01)
USPC .......................................................... 356/614

(58) Field of Classification Search
CPC ....................................................... G01B 11/14
USPC .......................................................... 356/614
See application file for complete search history.

(56) References Cited

U.S. PATENT DOCUMENTS

| 4,988,189 A | 1/1991 | Kroupa et al. |
| 5,044,703 A | 9/1991 | Dahnert |

(Continued)

FOREIGN PATENT DOCUMENTS

| CA | 2370345 | 8/2002 |
| CA | 2568086 | 5/2008 |

(Continued)

*Primary Examiner* — Roy M Punnoose
(74) *Attorney, Agent, or Firm* — Fasken Martineau (57) ABSTRACT

A mobile storage having a mobile storage unit having a detection side; an opposing component having an aisle side facing the detection side; the mobile storage unit being movable between a closed position and an open position wherein an aisle is defined; at least one detection module having an optical pulse emitter and an optical detector both provided at an end, facing the aisle, the optical pulse emitter emitting a light pulse, the optical detector detecting a reflection of the light pulse. An object detection method for a mobile storage comprising comparing a temporal reflection signal to a background temporal reflection signal to detect the presence of an object; and indicating a status of the aisle to be presence of an object if the object is detected to be present.

32 Claims, 9 Drawing Sheets

(56) References Cited

U.S. PATENT DOCUMENTS

| | | |
|---|---|---|
| 5,121,975 A | 6/1992 | Dahnert |
| 5,160,190 A * | 11/1992 | Farrell et al. ............ 312/201 |
| 5,359,191 A | 10/1994 | Griesemer et al. |
| 5,408,089 A * | 4/1995 | Bruno et al. ............ 250/221 |
| 5,417,487 A | 5/1995 | Dahnert |
| 5,427,444 A | 6/1995 | Griesemer |
| 5,569,910 A * | 10/1996 | Griesemer ............ 250/221 |
| 5,670,778 A | 9/1997 | Smith |
| 5,850,082 A | 12/1998 | Eaton et al. |
| 5,854,849 A | 12/1998 | Eaton |
| 6,091,064 A | 7/2000 | Eaton et al. |
| 6,233,005 B1 | 5/2001 | Cornillault et al. |
| 6,384,407 B1 | 5/2002 | Frank |
| 6,707,028 B2 * | 3/2004 | Housh et al. ............ 250/222.1 |
| 7,281,608 B2 | 10/2007 | Hansl et al. |
| 7,484,631 B2 | 2/2009 | Bothun et al. |
| 7,508,145 B2 | 3/2009 | Bourke et al. |
| 7,521,665 B2 | 4/2009 | Reichinger et al. |
| 7,554,652 B1 | 6/2009 | Babin et al. |
| 7,583,037 B2 | 9/2009 | Bourke et al. |
| 7,591,630 B2 | 9/2009 | Lert, Jr. |
| 7,635,854 B1 | 12/2009 | Babin |
| 7,640,122 B2 | 12/2009 | Levesque et al. |
| 7,705,286 B2 | 4/2010 | Tourdot et al. |
| 7,855,376 B2 | 12/2010 | Cantin et al. |
| 7,868,759 B2 | 1/2011 | Zimmerman |
| 7,895,007 B2 | 2/2011 | Levesque et al. |
| 7,917,320 B2 | 3/2011 | Levesque et al. |
| 8,159,660 B2 | 4/2012 | Mimeault et al. |
| 2003/0184440 A1 | 10/2003 | Ballantyne |
| 2004/0141633 A1 | 7/2004 | Horie |
| 2008/0309914 A1 | 12/2008 | Cantin et al. |
| 2009/0051255 A1 * | 2/2009 | Arbel ............ 312/201 |
| 2009/0059615 A1 | 3/2009 | Wainright |
| 2010/0191418 A1 | 7/2010 | Mimeault et al. |
| 2010/0194595 A1 | 8/2010 | Mimeault et al. |
| 2010/0277713 A1 | 11/2010 | Mimeault |
| 2010/0309024 A1 | 12/2010 | Mimeault |
| 2011/0050883 A1 | 3/2011 | Ghose et al. |
| 2011/0205521 A1 | 8/2011 | Mimeault et al. |

FOREIGN PATENT DOCUMENTS

| | | |
|---|---|---|
| EP | 1811427 | 7/2007 |
| JP | 20044245587 | 9/2004 |
| WO | 9726625 | 7/1997 |
| WO | 02103649 | 12/2002 |
| WO | 2009079779 | 7/2009 |
| WO | 2011077400 | 6/2011 |
| WO | 2012011037 | 1/2012 |

* cited by examiner

3D OPTICAL DETECTION SYSTEM AND METHOD FOR A MOBILE STORAGE SYSTEM

CROSS-REFERENCE TO RELATED APPLICATIONS

The present application is a national phase entry of PCT Application Number PCT/IB2011/053172, entitled "3D OPTICAL DETECTION SYSTEM AND METHOD FOR A MOBILE STORAGE SYSTEM" filed on Jul. 15, 2011; which in turn claims priority of U.S. provisional patent application No. 61/366,989 filed Jul. 23, 2010, the specifications of which are hereby incorporated by reference.

TECHNICAL FIELD

The invention relates to mobile storage systems and more particularly to 3D optical detection systems for detecting the presence of an object in an open aisle.

BACKGROUND OF THE ART

The optimization of space for storing different kinds of material is the main benefit of mobile storage systems. However, using a mobile storage system implies security issues. When the need to open an aisle explicitly requires closing another aisle, it is very important to detect the presence of an object in the aisle before closing it.

Several detection systems have been developed and installed in mobile storage systems but two types of detection systems are currently in use. The first one uses motion sensors and assesses changes in ambient temperature produced by a moving subject. It is therefore not designed to detect a moving object since its temperature is the same as the ambient temperature. Also, motion sensors are not capable of detecting a stationary person. The second type of detection system utilizes an infrared source and an infrared receiver. Detection occurs when a subject or an object interferes with the reception by the receiver of the emitted infrared signal. Even if several sources and receivers are installed to cover the surface of the aisle, gaps can exist, leaving zones not covered by the detection system. Thus, there is a need for improvements in the detection of moving and stationary subjects and objects in mobile storage systems.

SUMMARY

It is an object of the present invention to provide a mobile storage system which addresses at least one of the above concerns.

One aspect of the invention provides a mobile storage having a mobile storage unit extending along a longitudinal axis, having a detection side; an opposing component extending substantially parallel to the longitudinal axis, having an aisle side facing the detection side of the mobile storage unit; the mobile storage unit being movable between a closed position wherein the detection side of the mobile storage unit and the aisle side of the opposing component are juxtaposed and an open position wherein the mobile storage unit and the opposing component are spaced-apart and a longitudinally extending aisle is defined therebetween; the mobile storage having at least one detection module having an optical pulse emitter and an optical detector both provided at an end of one of the detection side of the mobile storage unit and the aisle side of the opposing component, facing the aisle, the optical pulse emitter emitting a light pulse in a field-of-illumination, the optical detector detecting a reflection of the light pulse in a field-of-view, the field-of-illumination and the field-of-view being adapted to at least partly overlap and to cover at least a portion of a width of the aisle.

In one embodiment, the opposing component being selected from the group consisting of a wall, a second mobile storage unit and a stationary storage unit.

In one embodiment, the end is a longitudinal end, wherein the optical detector is facing the aisle from a longitudinal end of the aisle and wherein the field-of-illumination and the field-of-view are adapted to cover at least a portion of a length of the aisle.

In one embodiment, the end is one of a top and a bottom end, wherein the optical detector is facing the aisle from one of a top and a bottom end of the aisle wherein the field-of-illumination and the field-of-view are adapted to cover at least a portion of a height of the aisle.

In one embodiment, the field-of-illumination is adjusted to begin along the longitudinal axis.

In one embodiment, the field-of-illumination has a span of 90 degrees.

In one embodiment, the field-of-view is adjusted to begin along the longitudinal axis.

In one embodiment, the field-of-view has a span of 90 degrees.

In one embodiment, the mobile storage further comprises a control unit having a receiver for receiving a temporal reflection signal from the optical detector; a memory for storing the temporal reflection signal and a background temporal reflection signal; a processor having a signal analyzer for comparing the temporal reflection signal to the background temporal reflection signal to detect the presence of an object in the temporal reflection signal and indicating a status of the aisle to be presence of an object if the object is detected to be present.

In one embodiment, the at least one detection module is two detection modules, a first one of the two detection modules being provided at a first end of the detection side of the mobile storage unit and a second one of the two detection modules being provided at a second end of the aisle side of the opposing component, the first end and the second end being at longitudinally opposed ends of the aisle.

In one embodiment, the field-of-illumination has a span of 45 degrees.

In one embodiment, the field-of-view has a span of 45 degrees.

In one embodiment, the receiver receives two temporal reflection signals, one temporal reflection signal from each the optical detector; the memory stores the two temporal reflection signals; the signal analyzer compares and indicates for each temporal reflection signal of the two temporal reflection signals; wherein the processor further comprises a status determiner for determining a status of the aisle to be occupied if at least one of the status is the presence of an object and for determining a status of the aisle to be empty if both of the status is the absence of an object.

In one embodiment, the aisle side and the detection side both include an additional detection module spaced apart longitudinally from the first detection module.

In one embodiment, the field-of-view of the optical detector has a plurality of channels, the optical detector being adapted to detect the light and create a separate signal for each of the channels.

In one embodiment, the optical pulse emitter emits one of visible light and invisible light.

In one embodiment, the optical pulse emitter is a Light-Emitting-Diode.

In one embodiment, the Light-Emitting-Diode comprises a diffuser.

In one embodiment, the optical pulse emitter is provided on a scanning mechanism which allows the pulse emitter to emit light pulses in the full span of the field-of-illumination.

In one embodiment, the mobile storage further comprises a retroreflector provided at a detection boundary on at least one of the mobile storage unit and the opposing component, the retroreflector strongly reflecting the light emitted by the optical pulse emitter toward the optical detector.

In one embodiment, the system further comprises a drive arrangement for movement of the at least one first mobile storage unit, along a path, one of toward and away from the opposing component, to open and close the aisle.

In one embodiment, the system further comprises a controller for the drive arrangement controlling the movement of the first mobile storage unit.

In one embodiment, the system further comprises a user input switch for the controller for activating the drive arrangement for movement of the first mobile storage unit.

In one embodiment, the control unit further comprises an alarm generator for generating an alarm if the status determiner determines the status of the aisle to be occupied.

In one embodiment, the system further comprises a visual status indicator for indicating the status of the aisle based on the alarm.

In one embodiment, the control unit further comprises an alarm generator for generating an alarm if the status determiner determines the status of the aisle to be occupied, the controller blocking movement of the mobile storage unit based on the alarm.

Another aspect of the present invention provides an object detection method for a mobile storage comprising receiving a temporal reflection signal from an optical detector; storing the temporal reflection signal; retrieving a background temporal reflection signal; comparing the temporal reflection signal to the background temporal reflection signal to detect the presence of an object in the temporal reflection signal; indicating a status of the aisle to be presence of an object if the object is detected to be present.

Another aspect of the present invention provides an object detection method for a mobile storage having a mobile storage unit extending along a longitudinal axis, having a detection side; an opposing component extending substantially parallel to the longitudinal axis, having an aisle side facing the detection side of the mobile storage unit; the mobile storage unit being movable between a closed position wherein the detection side of the mobile storage unit and the aisle side of the opposing component are juxtaposed and an open position wherein the mobile storage unit and the opposing component are spaced-apart and a longitudinally extending aisle is defined therebetween; the mobile storage having at least one detection module having an optical pulse emitter and an optical detector both provided at an end of one of the detection side of the mobile storage unit and the aisle side of the opposing component, facing the aisle, the optical pulse emitter emitting a light pulse in a field-of-illumination, the optical detector detecting a reflection of the light pulse in a field-of-view, the field-of-illumination and the field-of-view being adapted to at least partly overlap and to cover at least a portion of a width of the aisle, the method comprising: receiving a temporal reflection signal from the optical detector; storing the temporal reflection signal; retrieving a background temporal reflection signal; comparing the temporal reflection signal to the background temporal reflection signal to detect the presence of an object in the temporal reflection signal; indicating a status of the aisle to be presence of an object if the object is detected to be present.

In one embodiment, the at least one detection module is two detection modules; wherein the receiving the temporal reflection signal from the optical detector is receiving two temporal reflection signals, one temporal reflection signal from each optical detector of the two detection modules; wherein the storing the temporal reflection signal is storing the two temporal reflection signals; the method further comprising: carrying the steps of comparing and indicating for each temporal reflection signal of the two temporal reflection signals; determining a status of the aisle to be occupied if at least one of the status is the presence of an object and for determining a status of the aisle to be empty if both of the status is the absence of an object.

In one embodiment, the temporal reflection signal is a collection of temporal reflection signals from a plurality of channels of the optical detector.

In one embodiment, the temporal reflection signals of the collection are combined to obtain an overall temporal reflection signal, the step of comparing carrying out the comparison on the overall temporal reflection signal.

In one embodiment, the background temporal reflection signal including a plurality of background temporal reflection signals each corresponding to a specific detection channel, the step of comparing carrying out the comparison using each background temporal reflection signal and a corresponding one of the collection specified for a same detection channel.

In one embodiment, the mobile storage unit has a retroreflector provided at a boundary of a detection zone for the detection module, the method further comprising detecting a presence of a reflection from the retroreflector in the temporal reflection signal.

In one embodiment, the method further comprises receiving an indication that no object is present in the aisle; triggering the detection module to acquire the background temporal reflection signal; receiving the background temporal reflection signal, the background temporal reflection signal being acquired while no object is present in the aisle; storing the background temporal reflection signal.

In this specification, the term "LIDAR", an abbreviation for "Light Detection And Ranging", is intended to mean an optical remote sensing technology that measures properties of scattered light to find range and/or other information of a distant target. The prevalent method to determine distance to an object or surface is to use laser pulses. Like the similar radar technology, which uses radio waves, the range to an object is determined by measuring the time delay between transmission of a pulse and detection of the reflected signal.

Throughout this specification, reference will be made to "visible light" and "invisible light". It should be understood that "visible light" refers to light emitted at wavelengths which are visible to the human eye. Similarly, "invisible light" refers to light emitted at wavelengths which are not visible to the human eye.

BRIEF DESCRIPTION OF THE DRAWINGS

Having thus generally described the nature of the invention, reference will be made to the accompanying drawings, showing by way of illustration an example embodiment thereof and in which:

FIG. 2 comprises FIGS. 2A, 2B, 2C and 2D which show an aisle with two sections of a mobile storage system integrating the 3D optical detection system, in FIG. 2A, which is a top view, an object is detected by a single 3D optical detection system, in FIG. 2B, which is a top view, three objects are detected by a combination of two optical detection systems, in FIG. 2C, which is a top view, a series of multiple 3D optical detection systems are provided on each side of the aisle, in FIG. 2D, which is a side view, an object in the storage unit with a section in the open aisle can be detected by the 3D optical detection system placed at the top of the storage unit;

FIG. 5 comprises FIGS. 5A and 5B which show examples of LIDAR traces captured by the 3D optical detection system, in FIG. 5A, 16 traces are obtained in a free aisle to determine typical information from the background with a retroreflector, the floor and storage unit, and in FIG. 5B, 16 LIDAR traces are obtained for the same aisle in which two objects are present, the background having been compensated for using the traces of FIG. 5A.

It will be noted that throughout the appended drawings, like features are identified by like reference numerals.

DETAILED DESCRIPTION

Figure 1:
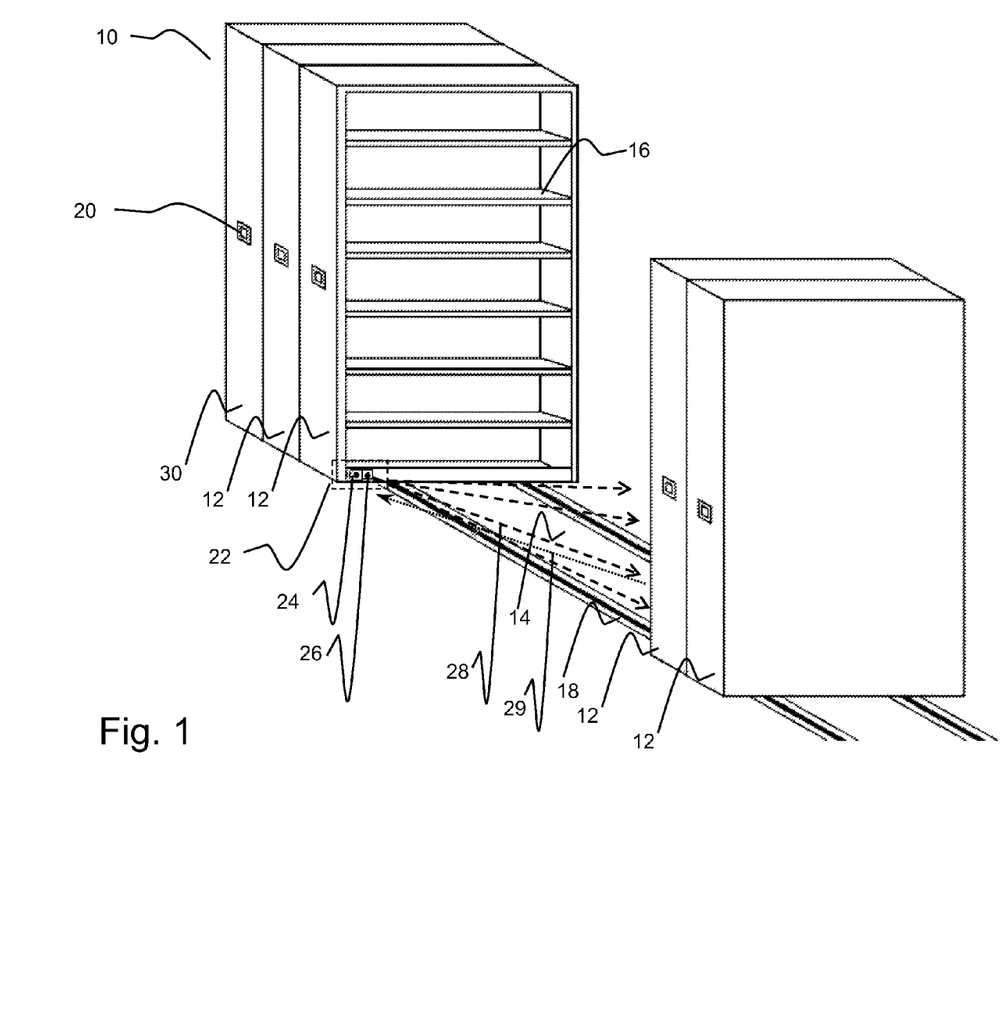
FIG. 1 shows an example embodiment of the 3D optical detection system in a mobile storage system.

FIG. 1 shows a mobile storage system 10 having several mobile storage units 12 and one stationary unit 30. A wall (not shown) can also be provided at an end of the system 10. An open aisle 14 permits access to storage space 16 (ex.: shelves). A drive mechanism or arrangement (not shown and typically using an electrical motor) allows the movement of a mobile storage unit 12 on a mounting rail 18 and permits closing an aisle to open another aisle. Control panel 20 (ex.: keypad) is an input to a controller unit (not shown) which can be used by a user to control the movement of a storage unit 12. By closing an aisle, a user can open another aisle and access a specific storage space. Each aisle of the mobile storage system 10 has a least one 3D optical detection system 22 for detecting an object or a person in an open aisle. Objects or people present in aisles will be referred to as objects.

The detection system 22 has at least one light source 26. Light source(s) 26 emits light pulses of visible or invisible light 28 over the surface of the open aisle 14 or close to the surface of the storage unit 12 in a field of illumination (FOI). The detection system 22 also has at least one optical sensor 24 with a corresponding field of view (FOV). The sensor(s) 24 receives the echo back signal 29 reflected from an object in the aisle. The FOV of the optical sensor 24 is adjusted with the FOI of the light source 26.

The detection system is based on LIDAR (Light Detection And Ranging) techniques. LIDAR methods are spatially more accurate than ultrasonic and radar methods and the 3D information improves robustness for the detection when compared to a machine vision system. The 3D system based on that LIDAR approach can extract a maximum of sensing information for a complex environment.

The detection system 22 detects and measures the distance between the sensor and an object based on the time-of-flight (TOF) principle. A short pulse is emitted and the system measures the time the light takes to travel from the system to the object and then to echo back to the system. The distance to the object is calculated from the measured time of the full round-trip of the optical pulse at the speed of light ($3 \times 10^8$ m/s).

Typical TOF rangefinders detect an object when the amplitude of the echo back signal exceeds a threshold. This threshold has to be set high enough to lower the chances of triggering on a noise spike, but not too high to provide sensitivity for objects with low reflectivity returning weak echo back pulses. When an echo back signal is high enough to trigger an event, a counter can measure the time elapsed between the beginning of the emitted pulse and the event of the detection of the echo back pulse. However, this technique, which uses analog comparators, has a performance drawback notably in terms of precision of the measurement of the distance of objects when the objects have a wide range of reflectivity. Because the detection is based on a constant threshold, the measured distance, based on the trigger event, will fluctuate as a function of the intensity of the echo back signal. In fact, typical optical pulses are not rectangular in shape but rather have a rounded waveform. Different objects with different reflectivities at the same distance will generate echo back signal with different amplitudes. With the same threshold level, the measurement of the distance will greatly fluctuate. For example, a strong reflection from a white object will trigger an event sooner than a black object at the same distance with a small echo back signal with a peak just above the threshold. Also, when the optical pulses emitted by the rangefinder hit more than one object in the FOV, the echo back signal in that case will be a combination of pulses with different amplitudes, which are more or less separated. Typical rangefinders will take in account the first or the last transition which is higher than the threshold. Finally, typical rangefinders will not be able to detect an object with an echo back signal lower than the preset threshold.

Detection system 22 overcomes these limitations by digitalizing the LIDAR trace and using digital signal processing. By accumulating several digitized sets of echo back pulse waveforms, the Signal Noise Ratio (SNR) is increased and the digital threshold for object detection can be set lower than in the case of analog techniques. Also, the analysis of the LIDAR traces permits to detect several objects at different distances. The echo back signal from several objects at different distances will generate a waveform with several peaks or a pulse shape different than the waveform emitted by the source. Correlation techniques between the reference signal waveform emitted by the source and the echo back signal can be carried out to determine the presence of several objects.

The detection system 22 can be installed on a side of the mobile storage unit 12 (for example near the bottom of the structure), or in some cases at the bottom of a wall or of a stationary unit 30. The light source 26 can be made of at least one Infrared LED. Other sources like a Visible LED or a Laser can also be used. Different lenses and diffusers can be used to optimize the match between the FOI of the source and the FOV of the optical sensor. A casing (enclosure, box) is used (which can be made of plastic, aluminum extrusion, etc.) to facilitate the installation and the maintenance, and to protect the components of the detection system. This casing can also be used as an optical component (window, lens, and diffuser). In some cases, a mirror can be integrated in the casing. The light can be reflected on the mirror and the optical sensor receives this reflected light instead of directly receiving the echo back signal from the object.

The detection system 22 can also be installed at the top of the storage unit and detects any object outside the storage space 16 or on the floor of the open aisle. To improve the robustness of the detection, detection systems can be installed on the side and the top of the open aisle.

Retroreflectors can be used to indicate an identifiable reference for the detection system. For example, a retroreflector at the bottom of the aisle can specify the boundary of the storage unit. A small rubber bumper can be installed at the bottom of the storage unit 12 to act as a boundary stopper when the mobile storage unit 12 is closed. The retroreflector can be placed on this bumper. The retroreflector installed in the FOI and the FOV of the detection system will be detected (with a strong signal) and the distance measured by the system will define the boundary of the aisle. An offset can be added if required. A retroreflector can also be installed on another detection system if it is installed in the end of the zone. In fact, even a very small retroreflector generates a strong echo back signal which can be detected and discriminated from another object and/or a wall. The signals from retroreflectors can be associated with identifiable references as the beginning and the end of the open aisle (zone of detection).

Status Indicators (not shown) may be used as a retroaction means for the users. For example, a green light indicator may indicate that there is no object in the aisle while a red light indicator may indicate the presence of an object. A person wishing to close an aisle to open another may visually understand the status of occupancy of the aisle. The illumination can be turned off when the aisle is completely closed. The illumination or Status Indicator can also be controlled to emit low frequency pulses to inform users of different status. For example, light pulse at low frequency (ex.: 1 pulse/sec) may indicate an alarm.

In case of emergency, because the Status indicator indicates which aisles are open, evacuation can be facilitated.

This information can also be seen on the Control panel 20. Indeed, using the information acquired during the detection process, the control panel 20 can store and display different data concerning the detected object. Its approximate size, position in 3D and reflectivity can be determined from the acquired data, especially when multiple channels are used. An educated guess can also be made as to the identity of the object. For example, a chair or a person could have a detection signature that could be recognized. Alarms generated by the system could include such data and records of detection events can also be kept and reported on.

Usually, all the cables to supply power and to communicate with the detection system use a dedicated space close to the mounting rails 18 or are installed at the top of the mobile storage system.

Figure 2A:
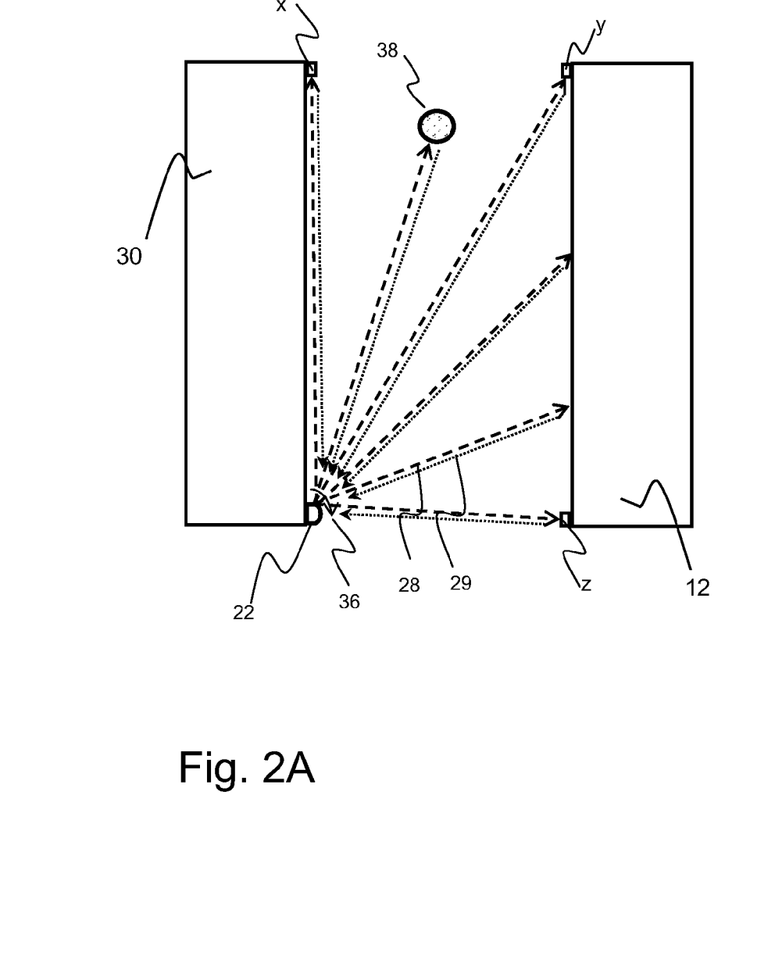

FIG. 2A shows a top view of an open aisle with two sections 12, 30 of a mobile storage system. The detection system 22 installed in the bottom of the storage system has a wide FOI and a corresponding FOV 36 covering the surface of the open section of the aisles to see any object in the open aisle. The open section can, for example, have a width of 4 feet or less for commercial applications, and a width of 20 feet or less for industrial applications. In that configuration, the FOI and corresponding FOV need to be 90 degrees to cover the entire aisle. The optical sensor can have several channels to increase lateral resolution covering the FOV. Some channels cover the end of the aisle; some others detect the bottom of the storage unit. The length of the aisle is calculated to determine the zone of detection for the end of aisle channel. When an object 38 is in the optical path of the FOI, the echo back signal allows detecting and measuring the distance of this object and determining if this object is in the open aisle (zone of detection).

Small retroreflectors x, y and z can be installed as a reference and can be detected and discriminated from other detected objects.

Figure 2B:
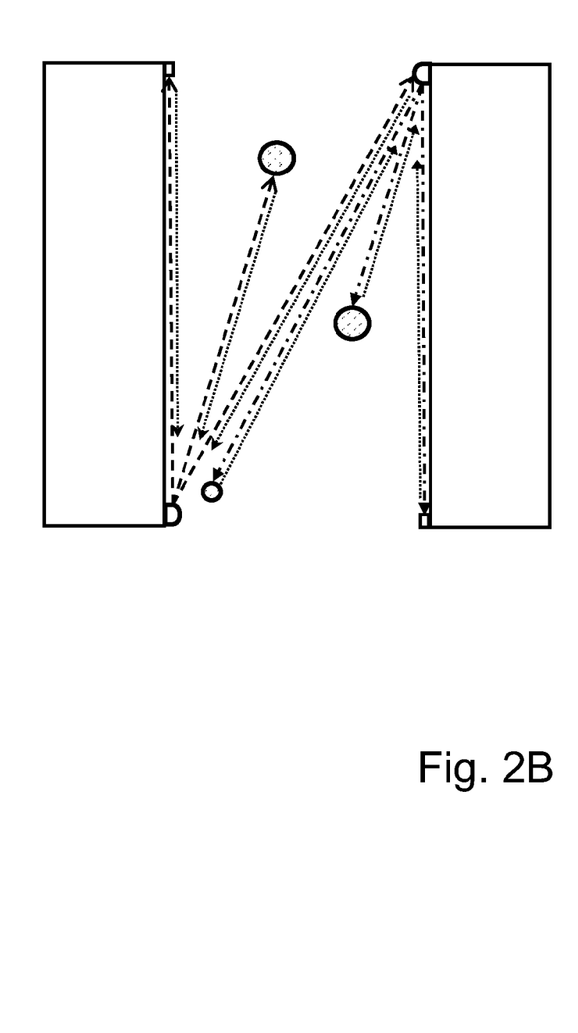

FIG. 2B shows an example configuration with two detection systems. Each detection system covers at least half of the surface of the open aisle. This configuration is independent of any reflection from the storage space 16 that can fluctuate depending on the contents in the storage and therefore allows detecting smaller object closer to the storage unit. Depending on the length of the aisle, some channels of one system can overlap with channels from the other detection system.

Figure 2C:
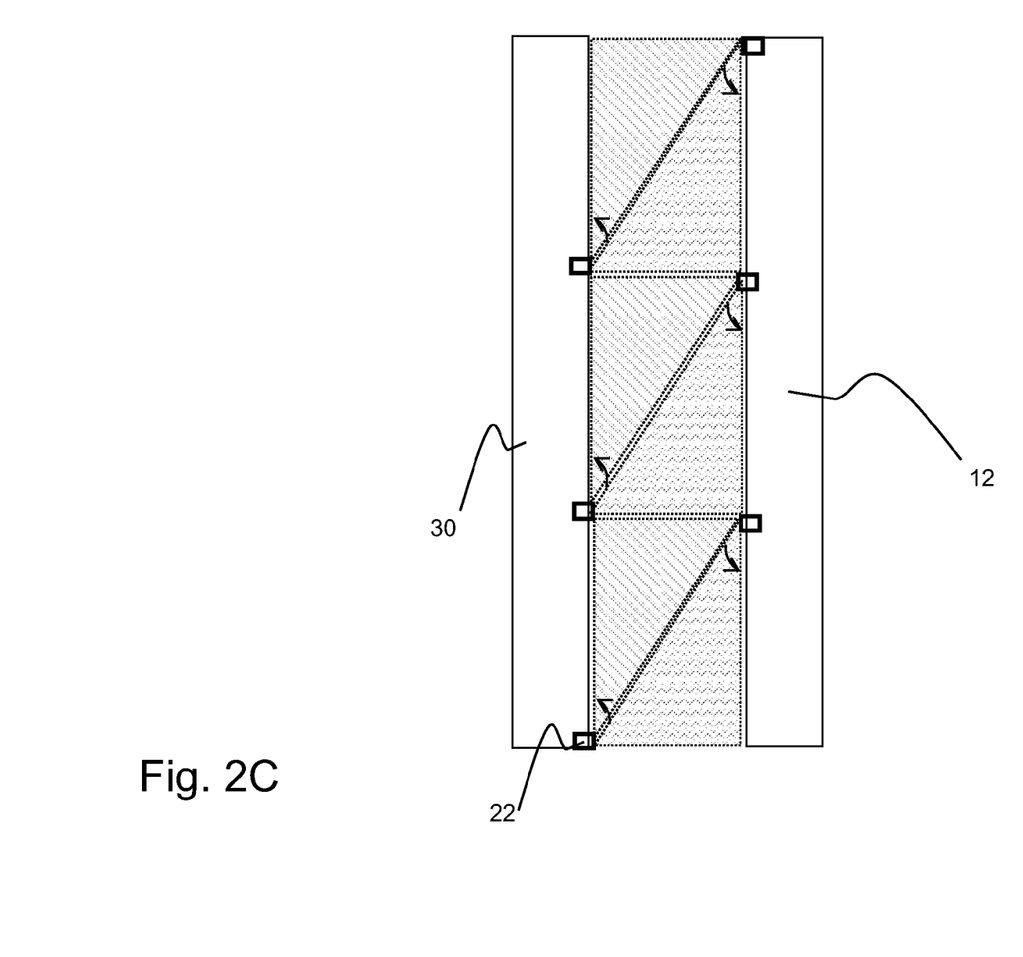

FIG. 2C shows a configuration with several detection systems for a very long aisle, used, for example, in industrial applications. More precisely, FIG. 2C shows an aisle with a sensor system having 6 detection systems 22. Each detection system 22 acts as a part of a network covering the whole surface of the aisle, even if the aisle is very long.

Figure 2D:
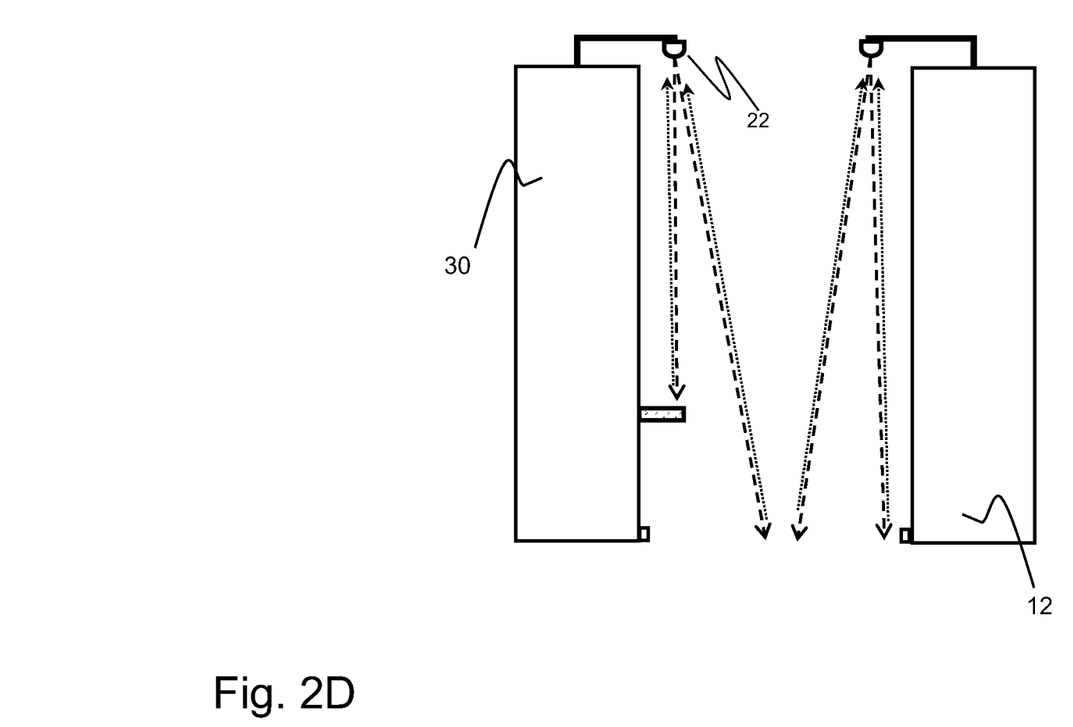

FIG. 2D shows a configuration with 2 detection systems 22 on the top of the unit storage 12 detecting any object outside the storage space 16. In that configuration, detection system 22 can be installed on the upper corner with a FOI/FOV of 90 degrees. Retroreflector can also be used to define the boundary of the detection zone. The height of the storage unit is calculated to determine the zone of detection of the bottom channels.

Figure 3:
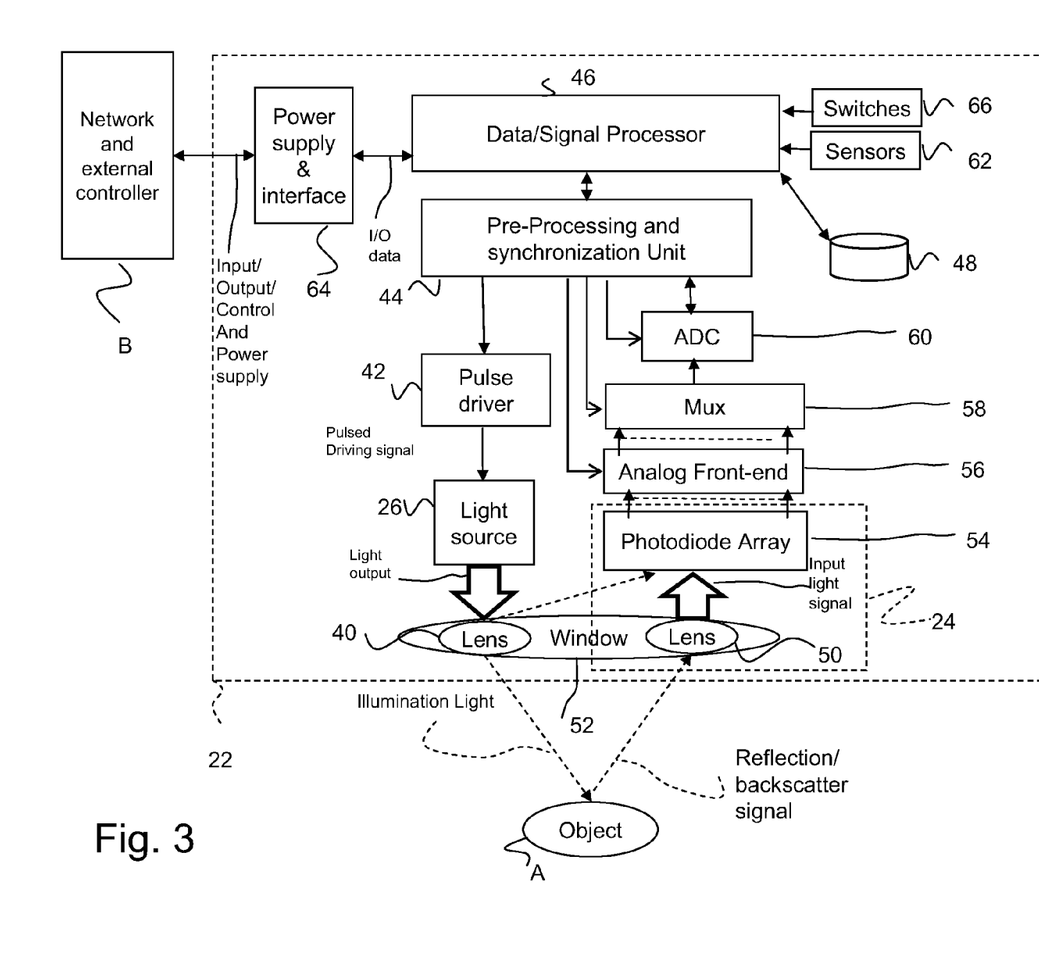
FIG. 3 shows a block diagram illustrating main components of an example embodiment of the 3D optical detection system for a mobile storage system.

FIG. 3 presents a block diagram of an example embodiment of the detection system 22. The detection system 22 has at least one optical sensor 24 and at least one light source 26. The light source 26 can have one or more solid-state lighting devices, LEDs for example (visible or non-visible). The light source 26 illuminates the aisle with a specific FOI by using a lens/diffuser 40. The light source 26 is connected to a pulse driver 42, so as to be driven into producing short pulses (for example shorter than 50 ns). The pulse driver 42 can also control and measure the current and the voltage of the light source 26. It can therefore control the intensity of the source 26 and can be used for monitoring and diagnosis purposes and eventually for sharing this information with the digital processor unit.

Sequencing of the drive signals is controlled by the Pre-Processing and Synchronization unit 44. The optical intensity of the light source can be monitored by the photodiode array and this information can be used by the Data/Signal Processor 46 for optimizing the data processing and for controlling the pulsed driver 42.

Diagnosis of the light source 26 can be performed by the Data/Signal Processor 46. The intensity of the echo back signal from the reference (for example the retroreflector), and from the section of the storage system in each channel covering the FOV are stored in a database memory 48. Each time an aisle is open and before any detection of a person entering the aisle, the detection system detects the background and the digital processor unit evaluates the intensity and the distance of every echo back signal from the reference, storage unit and wall, detecting if any part of the system has failed. Results of the diagnosis can be sent to the network.

During calibration, the level of reflection from the sensor window can be measured and stored in the database memory. During operation, the system can measure the reflection of the window using this diagnosis source and compare it with the calibration data stored in the database memory. A high level of reflection can mean that the window is dirty and may have an impact on the operation of the system. Diagnosis of the window can be sent to the external controller.

At least one lens 50 is used for receiving the light signal reflected back or diffused (i.e., backscattered) by an object in the open aisle. This lens 50 can be at a single location or distributed (multiple zone elements). Various types of lenses can be used, such as Fresnel lenses for example. Lenses for illumination and reception of the echo back signal can be integrated in a single optical element. A window 52 can be used to transmit and receive the light and to protect the detection system 22 from the environment. When the aisle is closed, the detection system 22 can be put in a hold mode.

A Photodiode array 54 is associated with the light source 26 and the lenses 50. The Photodiode array 54 is an optical detector adapted to collect light emitted by the light source 26 and reflected or back-scattered by the object A or particles in the open aisle. The Photodiode Array 54 is, for example, a PIN photodiode, an avalanche photodiode (APD), a CMOS or CCD array sensor, or a 3D camera sensor (time-of-flight depth sensor). Optical filters can be provided with the Photodiode array 54 to filter out ambient light background emitted from others sources of light, enhancing the performance of the detection system. Optical filters (not shown) can also be integrated in the window.

An analog front end 56 is connected to the photodiode array and amplifies the signal. A Multiplexer 58 selects each channel sequentially and sends the conditioned signal to an ADC 60 for the digitalization of the LIDAR trace.

A Pre-processing and synchronization unit 44 is connected to the pulse driver 42 and to the Analog front-end 56, MUX 58 and ADC 60 for controlling parameters such as the optical power of the light pulses, the number of pulses used for pre-process operation, gain of the amplifier, to select one channel from the Multiplexer, to synchronize between the pulse driver 42 and the ADC 60.

The Data/signal processor 46 is connected to the pre-processing and synchronization unit 44, and receives pre-processed data, i.e. the combined trace. The Data/signal processor 46 has a processing unit (e.g. a CPU, DSP, and microcontroller) so as to interpret the preprocessed data from the pre-processing and synchronization unit 44 in order to determine the state of the open aisle. Accordingly, information about the state of the open aisle is calculated by the Data/signal processor 46 as a function of the relationship between the background information stored in memory, the driving data and the detected light data based on the time-of-flight principle.

The Data/signal processor 46 also performs the calibration process. LIDAR trace analysis allows determining the zone of detection with the beginning and the end of an open aisle.

The detection system 22 has sensors 62 connected to the Data/signal processor 46. Sensors 62 can include temperature sensors, accelerometers, inclinometers, smoke sensors and humidity sensors, for example. Those sensors 62 are useful during installation and operation. For example, an accelerometer can be helpful in detecting the movement of the storage unit (opening or closing). Optional optical sources (not shown) like infrared or color LED for example, can be integrated in the optical detector for communication, detection and status purposes. Optional detector sources may be used as an indicator for the position of the optical detector normally placed at the end of the storage unit or for indicating the status of the section covered by the optical detector (presence or absence of an object).

The detection system 22 has a power supply and interface 64. The interface section is connected to Data/signal processor 46 and communicates with the network and the external controller B (RS-485, wireless, power line, Ethernet, CAN bus, relay contact, wireless link, etc.). Direct communication between the optical detectors is also possible. The information communicated is related to the detection of an object or a person in the open aisle and to other types of measurement (temperature, etc.). The network and the external controller can also program, calibrate, send information about the movement of the storage unit and control the detection system 22. Parameters like thresholds, intensity of illumination, etc, can be sent and stored in the database memory 48. The interface also controls the activation (On/Off) and synchronization of the pulse driver 42. Switches 66 can be used to reset the detection system or start a calibration sequence.

When an aisle is very long, several systems can be installed to cover the space for the detection purpose. Several detection sub-systems can be connected in a network. Sub-systems should synchronize their acquisitions.

Other configurations for the detection system 22 are possible. When several detection systems are needed, a configuration with one Data/signal processor 46 receiving information from several detection sub-modules is possible.

Others embodiments are possible. The photodiode array can be replaced by a single photodiode with a punctual optical source installed on a mechanical scanner. In this case, the light source has a narrow FOI and one discrete photodiode having a narrow FOV is used in combination with a scanning mechanism changing the portion of the space being probed by the detector system. This configuration minimizes the number of optoelectronic components but involves a mobile part in the scanning mechanism. The motion of the scanning mechanism is actuated by the processor since the orientation of the scanning mechanism will have an effect on the calculation of the position of the object.

Figure 4:
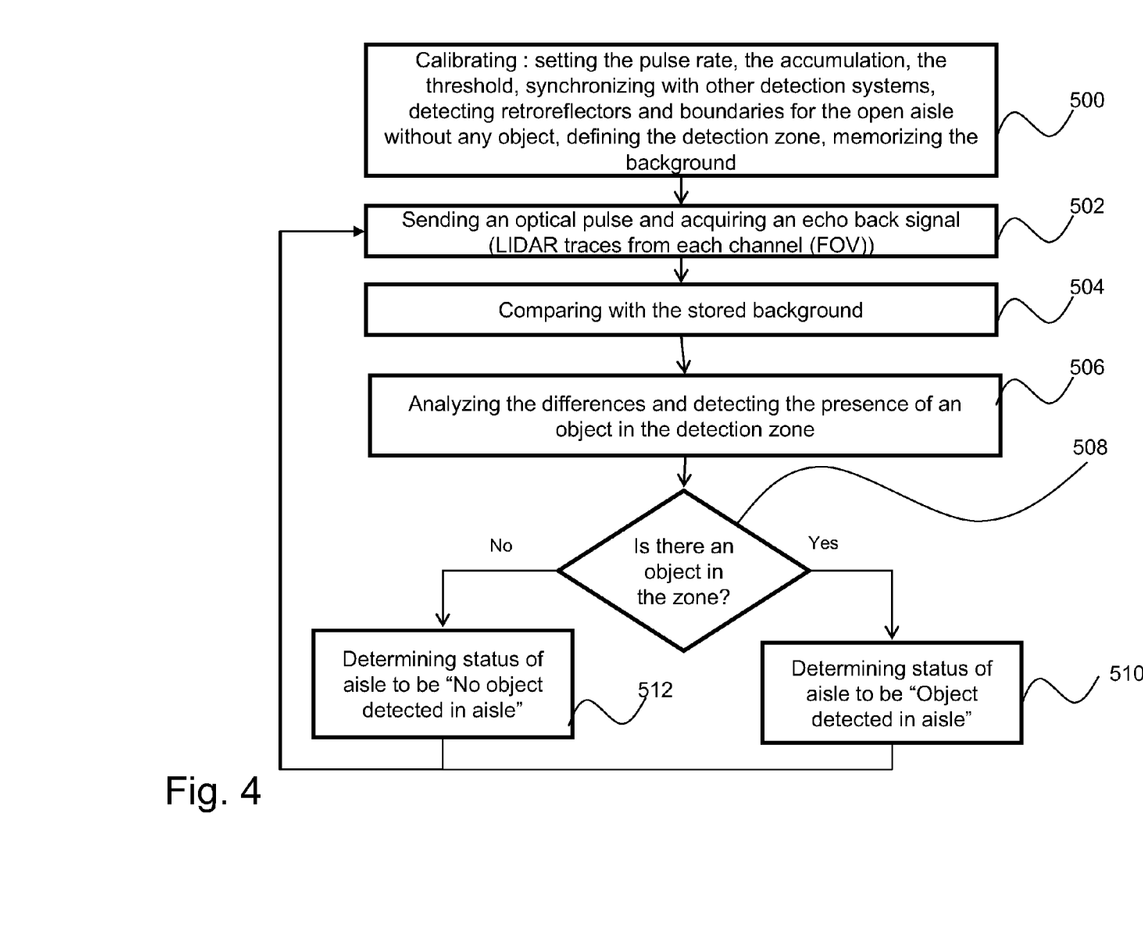
FIG. 4 is a flow chart of main steps of an example embodiment of the detection method.

FIG. 4 shows a flow chart of the typical process of this method and details typical operation of the detection system. Calibration step 500 sets all the parameters for the operation. This step is triggered by the network and the central controller or by a switch initiating the calibration. During calibration, the aisle should be open without any object inside. The calibration 500 activates the detection system of the open aisle and takes LIDAR traces on each channel (FOV) as a typical background. Calibration with several detection systems covering the entire aisle can be done at the same time. During the calibration 500, the detection system has to search and find reference targets (for example retroreflectors or other reference objects) defining the end of the aisle and determine the zone of detection for detection purposes. Manual adjustments can be needed to position the detection system at the right angle. The position of the detection system (or several detection systems) is adjusted to cover the entire open aisle. The measurement of the open aisle without any object is stored in the database memory (background).

Figure 5A:
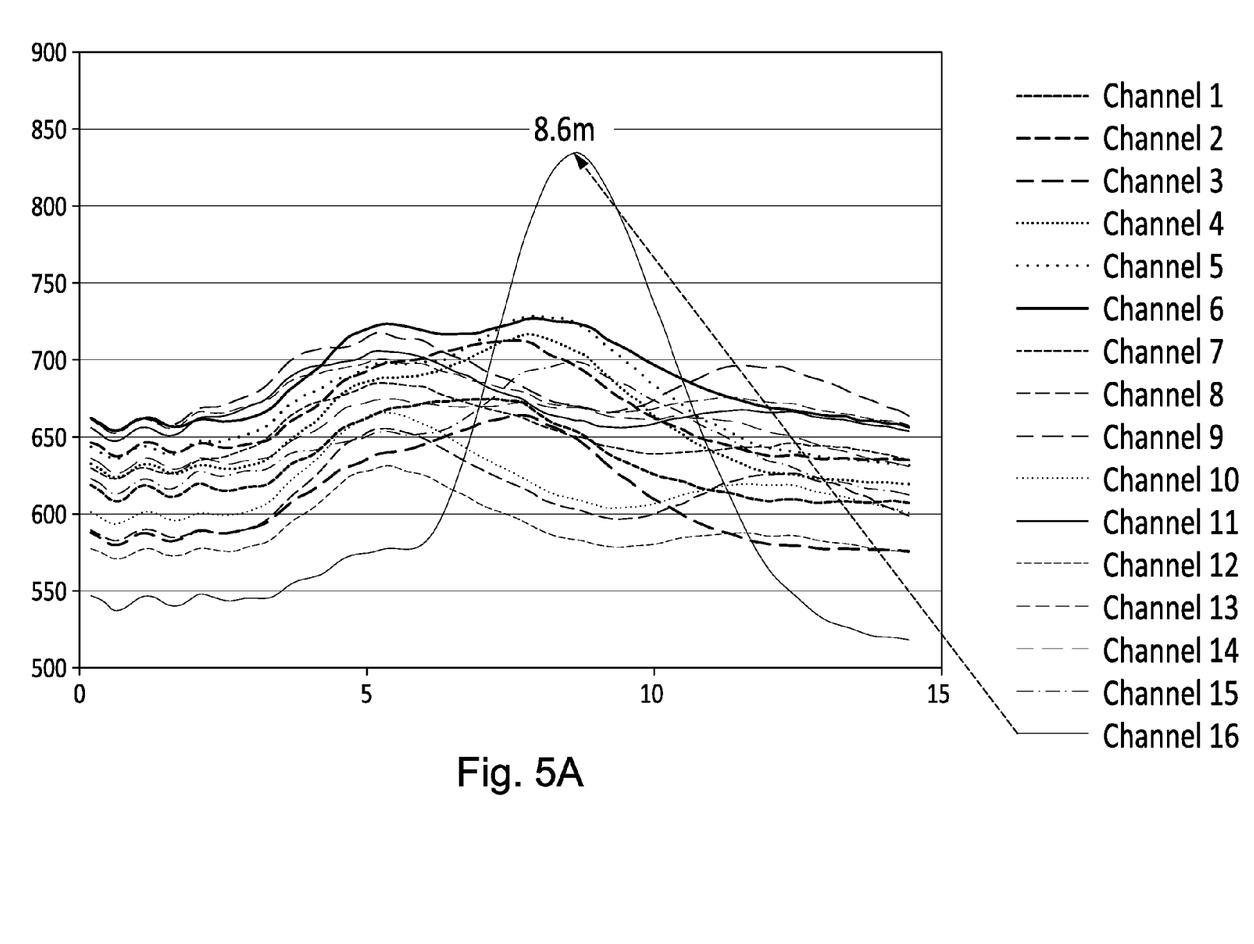

FIG. 5A shows a typical LIDAR trace (several channels) with an echo back signal from a retroreflector and from the bottom of a storage unit. At that stage, parameters like the intensity of the source, pulse rate, number of accumulation, level for the threshold and synchronization between detection systems (for example one master and slave(s)) can be set. The typical shape of the echo back signal (sometime already recorded during the production stage) can also be stored. Reflections from any other source of illumination (sun, lighting systems) are rejected by the detection system. When using more than one detection system, some channels from different detection systems can overlap the same zone. In general, information from each detection system is used and helps to increase the robustness of the detection.

At acquisition step 502, the detection system sends optical pulses and acquires a LIDAR trace on each channel (FOV). At comparison step 504, the processor compares (subtracts) all the LIDAR traces in each channel (FOV) to the corresponding information stored as a background and compares it with the calibration data (ex.: zone of detection) and thresholds. At analysis step 506, the processor analyses the LIDAR traces and when it finds an echo back signal with enough correlation with the shape of the optical pulse emitted by the light source, it measures the distance and determines, at 508, if the object is in the zone of detection. If not, the processor considers that there is no detected object 512. If there is an object, the status is determined to be that there is presence of an object 510. Information about the presence or the absence of an object is sent to the external controller by the network.

Figure 5B:
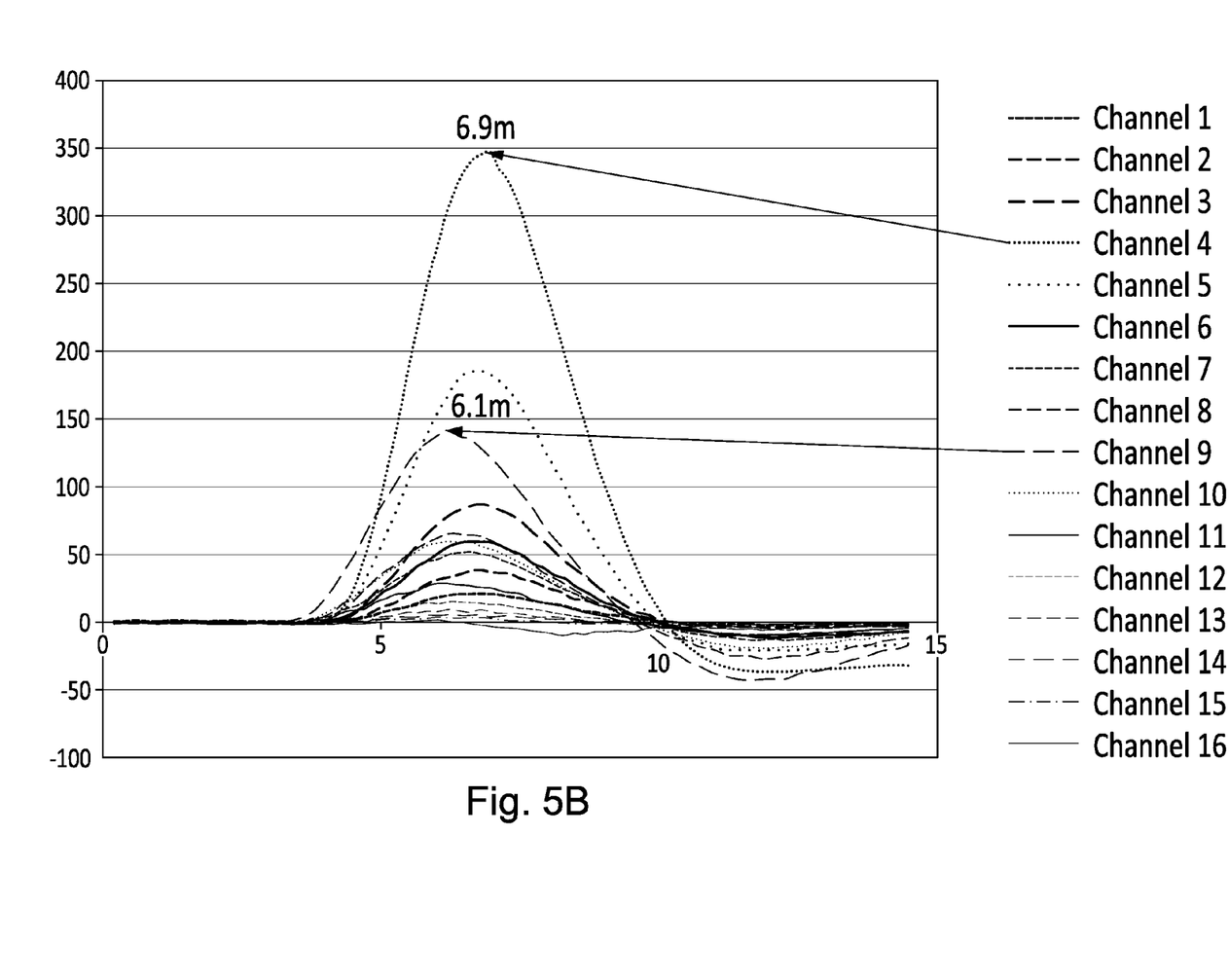

FIG. 5A shows a graphical representation of the 16 temporal reflection signals of an example embodiment in which an open aisle is free of any objects and FIG. 5B shows a graphical representation of the 16 temporal reflection signals of another example embodiment in which the open aisle has two objects. There are 16 signals in this example embodiment because the detector has 16 channels. Of the two objects that are detected, one is a black object with a small echo back signal (at 6.1 meters) and the second one is a white object that generates a strong echo back signal (at 6.9 meters). The amplitude of the echo back signal is dependent on the reflectivity, the size and the distance of the object but the position is dependent on the speed of light. The subtraction between an acquisition and the background can generate a signal with a negative amplitude. It is typically the case when an object with very low reflectivity is coming just in front of an object already detected (in front of a reflector for example) with a high reflectivity. As will be readily understood, the same object can be detected in several channels.

Once an object is detected, the processor can track and classify this object. For example, an object can be classified as an entering object. This can be done by detecting the position of the object at time T0, storing its position, detecting the object at time T1, and determining the displacement of this object. For example, with a configuration of two detection systems placed at the bottom of the storage unit (FIG. 2B), a person entering at one end of the aisle is clearly detected by the detector system installed at that end. When this person moves further into the aisle, the position of the object changes because the measured distance changes and the object can also be detected in different channels in the FOV of the detector system up to the point where this object can enter the FOV of the second detector system installed at the other end of the aisle. This person can leave the aisle at the other end and the detector system at the other end will detect this leaving person or, this person can go back to the original end and leave the aisle by the same end and will be detected again by the optical detector at that end. The signature and behavior of an object versus a person are different and can be used as information for improving the security of the system. The number of entering objects can be used for counting the number of times presence of an object is detected in an aisle (ex.: statistic purposes). Each object can be tracked and detected until the object leaves the aisle (exiting).

The tracking of an object can also be useful to detect a person standing in the middle of the aisle and climbing up the storage unit. In that case, the person is still in the aisle and the system will continue to report that someone is in the aisle even if the line of illumination is no longer disrupted. For example, three zones can be set, two on both sides of the aisle and one covering the middle of the aisle. The tracking process can determine the position of the object and the system evaluates whether an object is leaving the aisle or climbing in the middle of the aisle. For this situation, the configuration with detection systems installed at the top of the storage unit (FIG. 2D) is preferred and also allows detecting any object installed on the storage space with a section outside the storage space.

Figure 6:
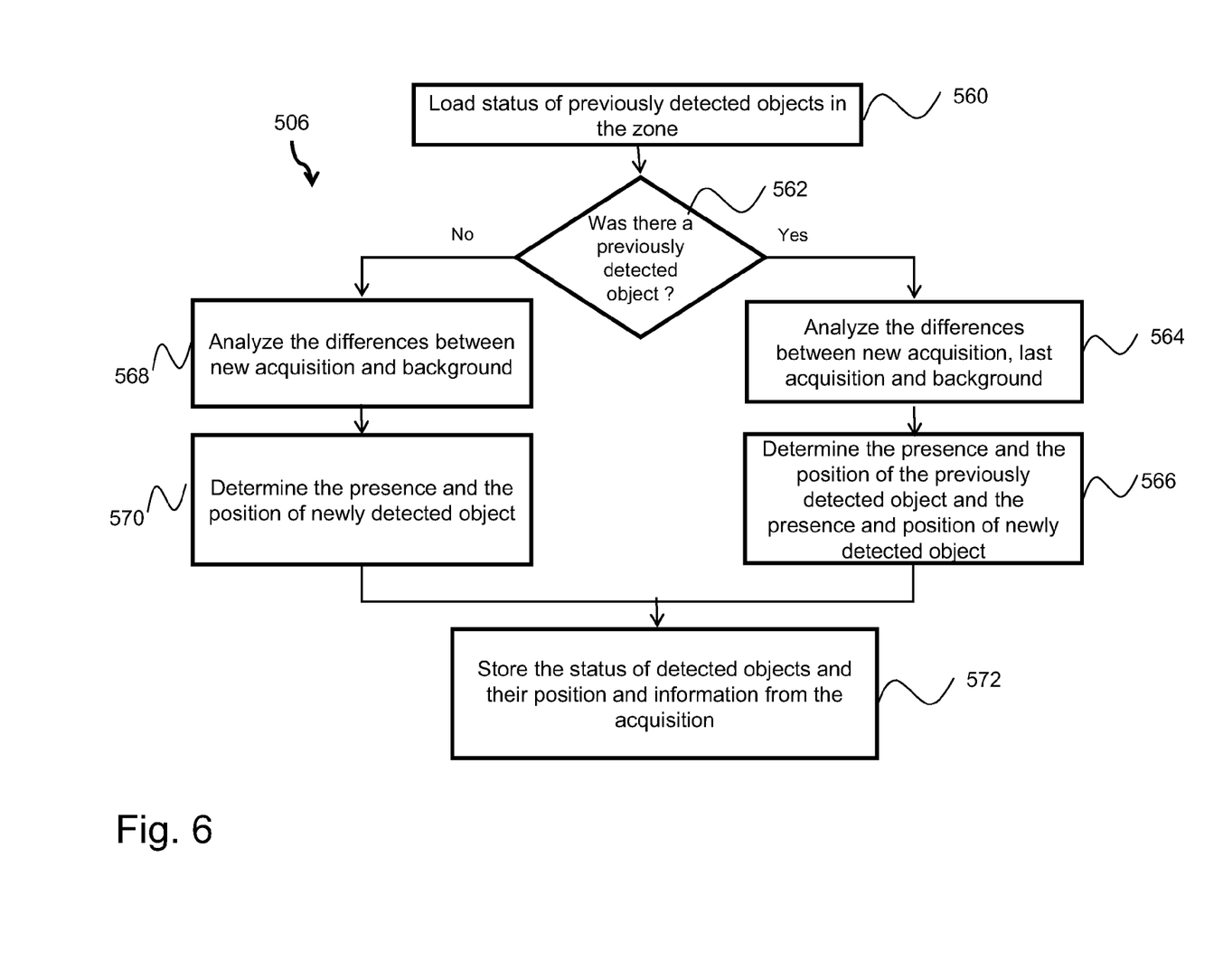
FIG. 6 is a flow chart of example steps for the analysis of the differences between an acquisition and the background for determining the presence of an object.

The flow chart of FIG. 6 details step 506 of the flow chart of FIG. 4. At step 560, the information of the previous status is loaded and, in the case of the presence of at least one object in the zone, the object position(s) and the last acquisition data are also loaded. At step 562, the status is read. Step 564 occurs in the case of the presence of at least an object detected in the last sequence. At step 564 the difference between the new acquisition, the last acquisition and the background reference signals are analyzed to determine the evolution of the previously detected objects. At step 566, the presence and position of the previously detected objects are updated (if they are still in the zone) and the presence and position of new objects (if new objects are detected) are stored.

If no detected object was previously present in the zone, an analysis of the difference between the new acquisition and the background is carried out at step 568. At step 570, the process determines the presence or absence of newly detected objects. After steps 566 or 570, the status of any detected objects and information about their position as well as information about the acquisition data (the "new acquisition" in that sequence will become a "last acquisition" in the next sequence) are stored at step 572.

The detection system can receive information from the external controller. For example, information about the opening and closing of an aisle can be received and used by the detection unit. When the aisle is closing, the optical sensor will detect that the position of the reference (for example the retroreflector) at the end of the aisle is changing. Detection of an entering object or of an object falling from a shelf toward the ground in the zone should be carried out when closing the aisle. The detection system should immediately send this information to the external controller to stop the movement of the storage unit.

When an aisle is opening, the detection system can perform an auto diagnosis particularly on the typical background, the distance of the end of the aisle, on the position of the region of interest and on several parameters, until a person enters in the aisle. The results of the diagnosis can be sent to the external controller.

The detection system can be installed on existing mobile storage systems or provided during installation. A reset of the detection system may be triggered manually from the control panel when there may be an object in an aisle while the detection system reports otherwise. In some cases, it may be useful to reset the system. For example, if the system has detected a person and lost the detection in the middle in the aisle, the detection system may consider that this person is still in the aisle even if the person is no longer present. In that case, a user can perform a manual reset by using a switch on the optical detector or at the control panel. The system will restart and may diagnostic itself before entering in its normal operation mode.

While illustrated in the block diagrams as groups of discrete components communicating with each other via distinct data signal connections, it will be understood by those skilled in the art that the illustrated embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the described embodiment.

The embodiments described above are intended to be exemplary only. The scope of the invention is therefore intended to be limited solely by the appended claims.

We claim:

1. A mobile storage comprising:
a mobile storage unit extending along a longitudinal axis, having a detection side;
an opposing component extending substantially parallel to the longitudinal axis, having an aisle side facing the detection side of the mobile storage unit, the opposing component being one of a wall, a second mobile storage unit and a stationary storage unit;
the mobile storage unit being movable between a closed position wherein the detection side of the mobile storage unit and the aisle side of the opposing component are juxtaposed and an open position wherein the mobile storage unit and the opposing component are spaced-apart and a longitudinally extending aisle is defined therebetween;
the mobile storage having at least one detection module having an optical pulse emitter and an optical detector both provided at an end of one of the detection side of the mobile storage unit and the aisle side of the opposing component, facing the aisle, the optical pulse emitter emitting a light pulse in a field-of-illumination, the optical detector detecting a reflection of the light pulse in a field-of-view, the field-of-illumination and the field-of-view being adapted to at least partly overlap and to cover at least a portion of a width of the aisle.

2. The mobile storage of claim 1, wherein the end is a longitudinal end, wherein the optical detector is facing the aisle from a longitudinal end of the aisle and wherein the field-of-illumination and the field-of-view are adapted to cover at least a portion of a length of the aisle.

3. The mobile storage of claim 1, wherein the end is one of a top and a bottom end, wherein the optical detector is facing the aisle from one of a top and a bottom end of the aisle wherein the field-of-illumination and the field-of-view are adapted to cover at least a portion of a height of the aisle.

4. The mobile storage of claim 1, wherein at least one of the field-of-illumination and the field of view is adjusted to begin along the longitudinal axis.

5. The mobile storage of claim 4, wherein at least one of the field-of-illumination and the field of view has a span of 90 degrees.

6. The mobile storage of claim 1, wherein the mobile storage further comprises
a control unit having a receiver for receiving a temporal reflection signal from the optical detector;
a memory for storing the temporal reflection signal and a background temporal reflection signal;
a processor having a signal analyzer for comparing the temporal reflection signal to the background temporal reflection signal to detect the presence of an object in the temporal reflection signal and indicating a status of the aisle to be presence of an object if the object is detected to be present.

7. The mobile storage of claim 1, wherein the at least one detection module is two detection modules, a first one of the two detection modules being provided at a first end of the detection side of the mobile storage unit and a second one of the two detection modules being provided at a second end of the aisle side of the opposing component, the first end and the second end being at longitudinally opposed ends of the aisle.

8. The mobile storage of claim 7, at least one of the field-of-illumination and the field-of-view has a span of less than 45 degrees.

9. The mobile storage of claim 7, wherein each receiver of said two detection modules receives a respective temporal reflection signal;
the memory stores the two temporal reflection signals;
the signal analyzer compares and indicates for each temporal reflection signal of the two temporal reflection signals;
wherein the processor further comprises a status determiner for determining a status of the aisle to be occupied if at least one of the status is the presence of an object and for determining a status of the aisle to be empty if both of the status is the absence of an object.

10. The mobile storage of claim 7, wherein the aisle side and the detection side both include an additional detection module spaced apart longitudinally from the first detection module.

11. The mobile storage of claim 1, wherein the field-of-view of the optical detector has a plurality of channels, the optical detector being adapted to detect the light in each channel and create a separate signal for each of the channels.

12. The mobile storage of claim 1, wherein the optical pulse emitter emits one of visible light and invisible light.

13. The mobile storage of claim 1, wherein the optical pulse emitter is a Light-Emitting-Diode.

14. The mobile storage of claim 13, wherein the Light-Emitting-Diode comprises a diffuser.

15. The mobile storage of claim 1, wherein the optical pulse emitter is provided on a scanning mechanism which allows the pulse emitter to emit light pulses in the full span of the field-of-illumination.

16. The mobile storage of claim 1, wherein the mobile storage further comprises a retroreflector provided at a detection boundary on at least one of the mobile storage unit and the opposing component, the retroreflector strongly reflecting the light emitted by the optical pulse emitter toward the optical detector.

17. The mobile storage of claim 1, wherein the system further comprises a drive arrangement for movement of the at least one first mobile storage unit, along a path, one of toward and away from the opposing component, to open and close the aisle.

18. The mobile storage of claim 17, wherein the system further comprises a controller for the drive arrangement controlling the movement of the first mobile storage unit.

19. The mobile storage of claim 18, wherein the system further comprises a user input switch for the controller for activating the drive arrangement for movement of the first mobile storage unit.

20. The mobile storage of claim 1, wherein the control unit further comprises an alarm generator for generating an alarm if the status determiner determines the status of the aisle to be occupied.

21. The mobile storage of claim 20, wherein the system further comprises a visual status indicator for indicating the status of the aisle based on the alarm.

22. The mobile storage of claim 18, wherein the control unit further comprises an alarm generator for generating an alarm if the status determiner determines the status of the aisle to be occupied, the controller blocking movement of the mobile storage unit based on the alarm.

23. An object detection method for a mobile storage comprising receiving a temporal reflection signal from an optical detector;
storing the temporal reflection signal;
retrieving a background temporal reflection signal;

comparing the temporal reflection signal to the background temporal reflection signal to detect the presence of an object in the temporal reflection signal;

indicating a status of the aisle to be presence of an object if the object is detected to be present.

24. An object detection method for a mobile storage having a mobile storage unit extending along a longitudinal axis, having a detection side; an opposing component extending substantially parallel to the longitudinal axis, having an aisle side facing the detection side of the mobile storage unit; the mobile storage unit being movable between a closed position wherein the detection side of the mobile storage unit and the aisle side of the opposing component are juxtaposed and an open position wherein the mobile storage unit and the opposing component are spaced-apart and a longitudinally extending aisle is defined therebetween; the mobile storage having at least one detection module having an optical pulse emitter and an optical detector both provided at an end of one of the detection side of the mobile storage unit and the aisle side of the opposing component, facing the aisle, the optical pulse emitter emitting a light pulse in a field-of-illumination, the optical detector detecting a reflection of the light pulse in a field-of-view, the field-of-illumination and the field-of-view being adapted to at least partly overlap and to cover at least a portion of a width of the aisle, the method comprising:

receiving a temporal reflection signal from the optical detector;

storing the temporal reflection signal;

retrieving a background temporal reflection signal;

comparing the temporal reflection signal to the background temporal reflection signal to detect the presence of an object in the temporal reflection signal;

indicating a status of the aisle to be presence of an object if the object is detected to be present.

25. The object detection method of claim 23,
wherein the at least one detection module is two detection modules;
wherein the receiving the temporal reflection signal from the optical detector is receiving two temporal reflection signals, one temporal reflection signal from each optical detector of the two detection modules;
wherein the storing the temporal reflection signal is storing the two temporal reflection signals;
the method further comprising:
carrying the steps of comparing and indicating for each temporal reflection signal of the two temporal reflection signals;
determining a status of the aisle to be occupied if at least one of the status is the presence of an object and for determining a status of the aisle to be empty if both of the status is the absence of an object.

26. The object detection method of claim 23, wherein the temporal reflection signal is a collection of temporal reflection signals from a plurality of channels of the optical detector.

27. The object detection method of claim 26, wherein the temporal reflection signals of the collection are combined to obtain an overall temporal reflection signal, the step of comparing carrying out the comparison on the overall temporal reflection signal.

28. The object detection method of claim 26, wherein the background temporal reflection signal including a plurality of background temporal reflection signals each corresponding to a specific detection channel, the step of comparing carrying out the comparison using each background temporal reflection signal and a corresponding one of the collection specified for a same detection channel.

29. The object detection method of claim 23, wherein the mobile storage unit has a retroreflector provided at a boundary of a detection zone for the detection module, the method further comprising detecting a presence of a reflection from the retroreflector in the temporal reflection signal.

30. The object detection method of claim 23, wherein the method further comprises
receiving an indication that no object is present in the aisle;
triggering the detection module to acquire the background temporal reflection signal;
receiving the background temporal reflection signal, the background temporal reflection signal being acquired while no object is present in the aisle;
storing the background temporal reflection signal.

31. The object detection method of claim 23, wherein the method further comprises
if said status was indicated as being presence of said object, retrieving said stored temporal reflection signal;
obtaining position information about a position of said object;
receiving a second temporal reflection signal from the optical detector;
storing the second temporal reflection signal;
comparing the second temporal reflection signal to the background temporal reflection signal and to the retrieved stored temporal reflection signal using said position information to detect at least one of the presence of said object and at least one of the presence of a newly detected object in the second temporal reflection signal;
indicating a status of the aisle to be presence of an object if at least one of said object and the newly detected object is detected to be present.

32. The object detection method of claim 23, wherein the method further comprises if said status was indicated as being presence of said object, obtaining position information about a position of said object.

* * * * *